Figure 1:
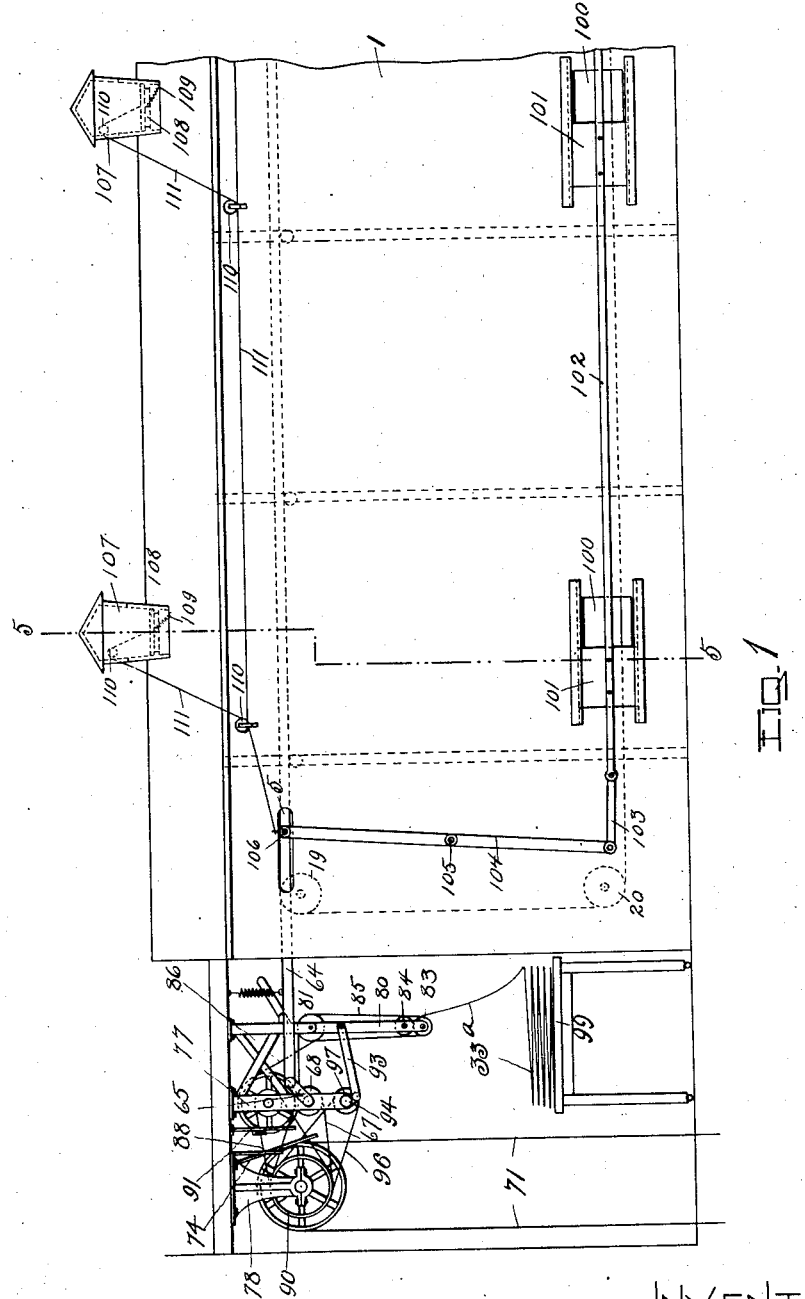

J. H. SCHALLER.
FABRIC DRYING APPARATUS.
APPLICATION FILED DEC. 7, 1910.

1,038,002.

Patented Sept. 10, 1912.
11 SHEETS—SHEET 3.

J. H. SCHALLER.
FABRIC DRYING APPARATUS.
APPLICATION FILED DEC. 7, 1910.

1,038,002.

Patented Sept. 10, 1912.
11 SHEETS—SHEET 4.

WITNESSES
R. A. Leduc
J. E. Donsbach

INVENTOR
Johannes H. Schaller
By Frank C. Curtis
Atty.

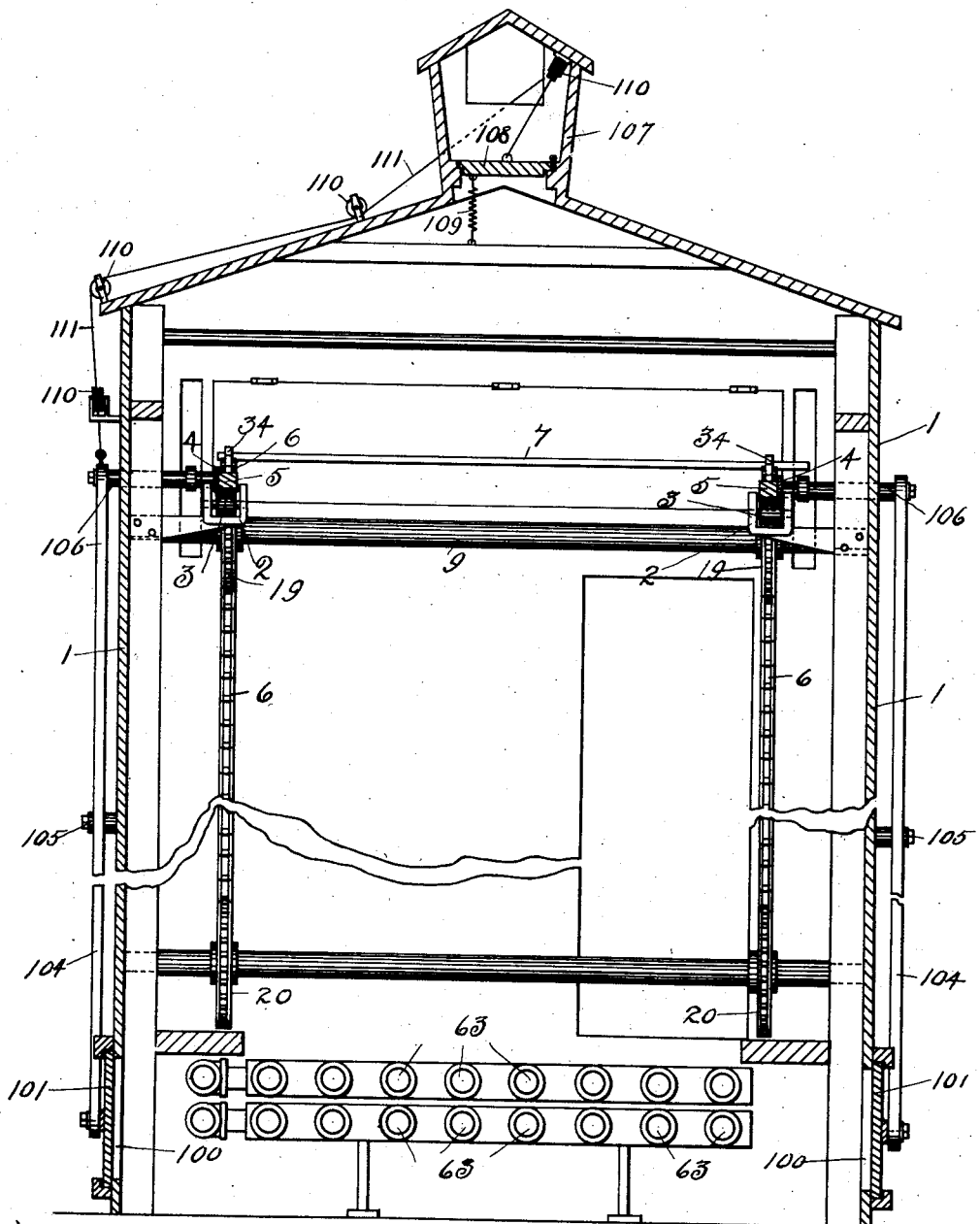

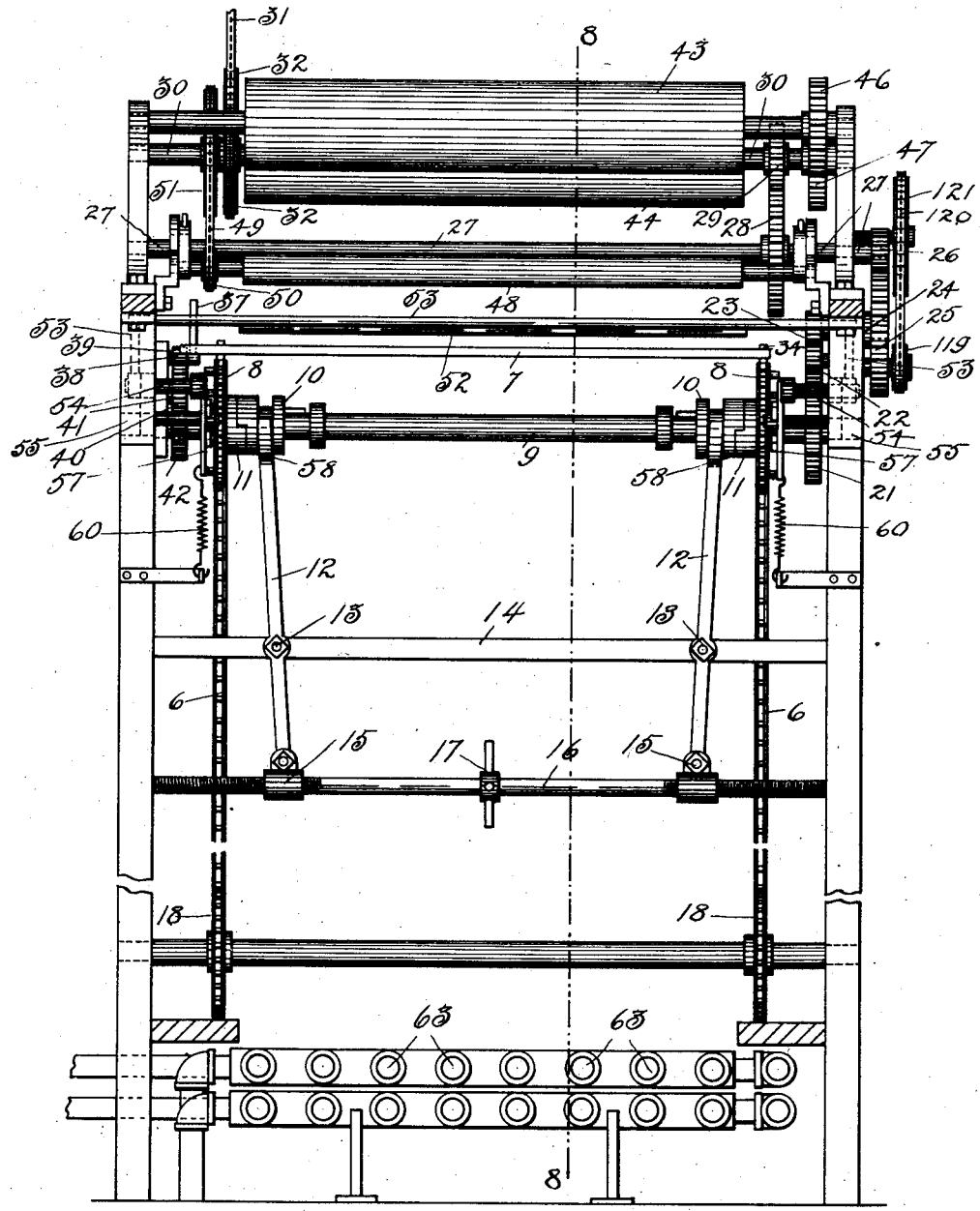

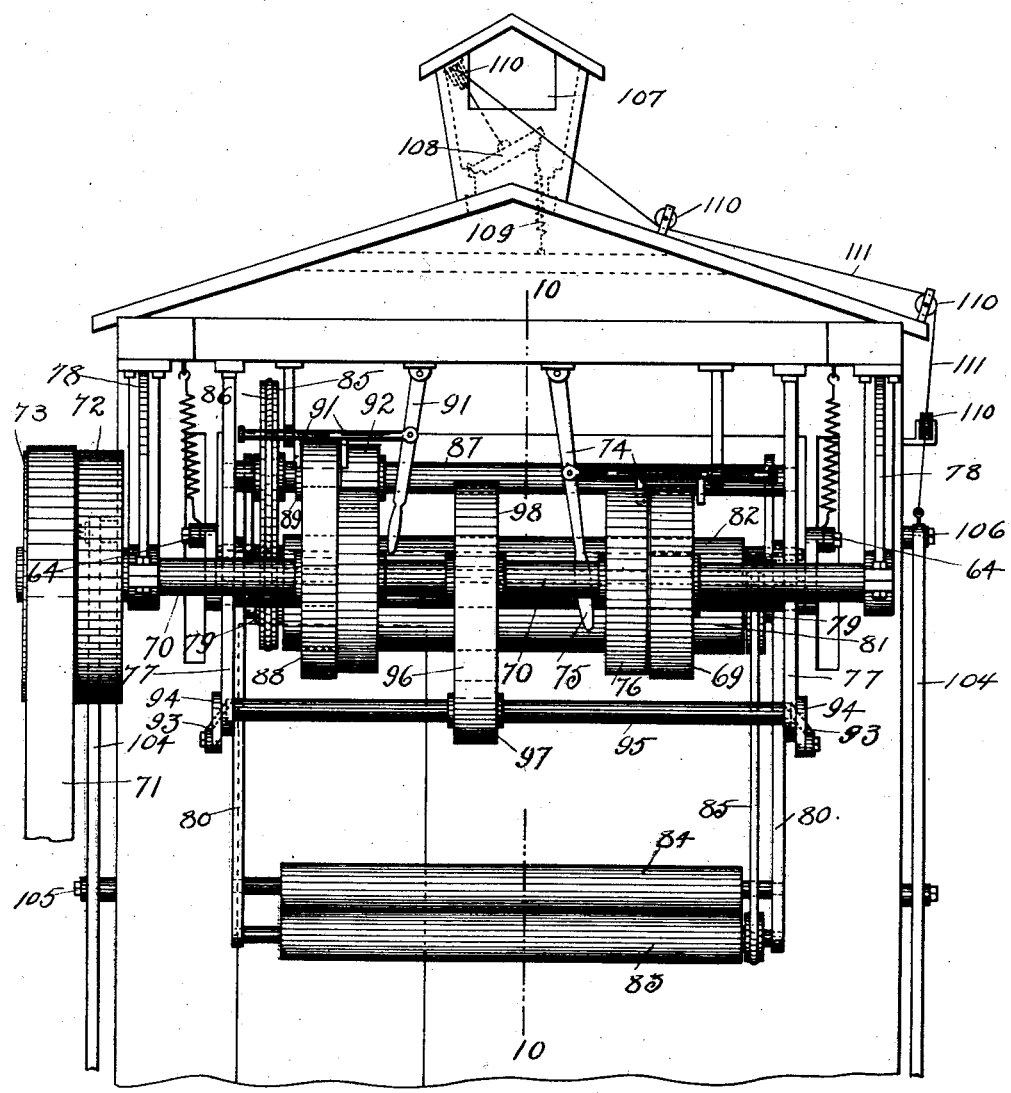

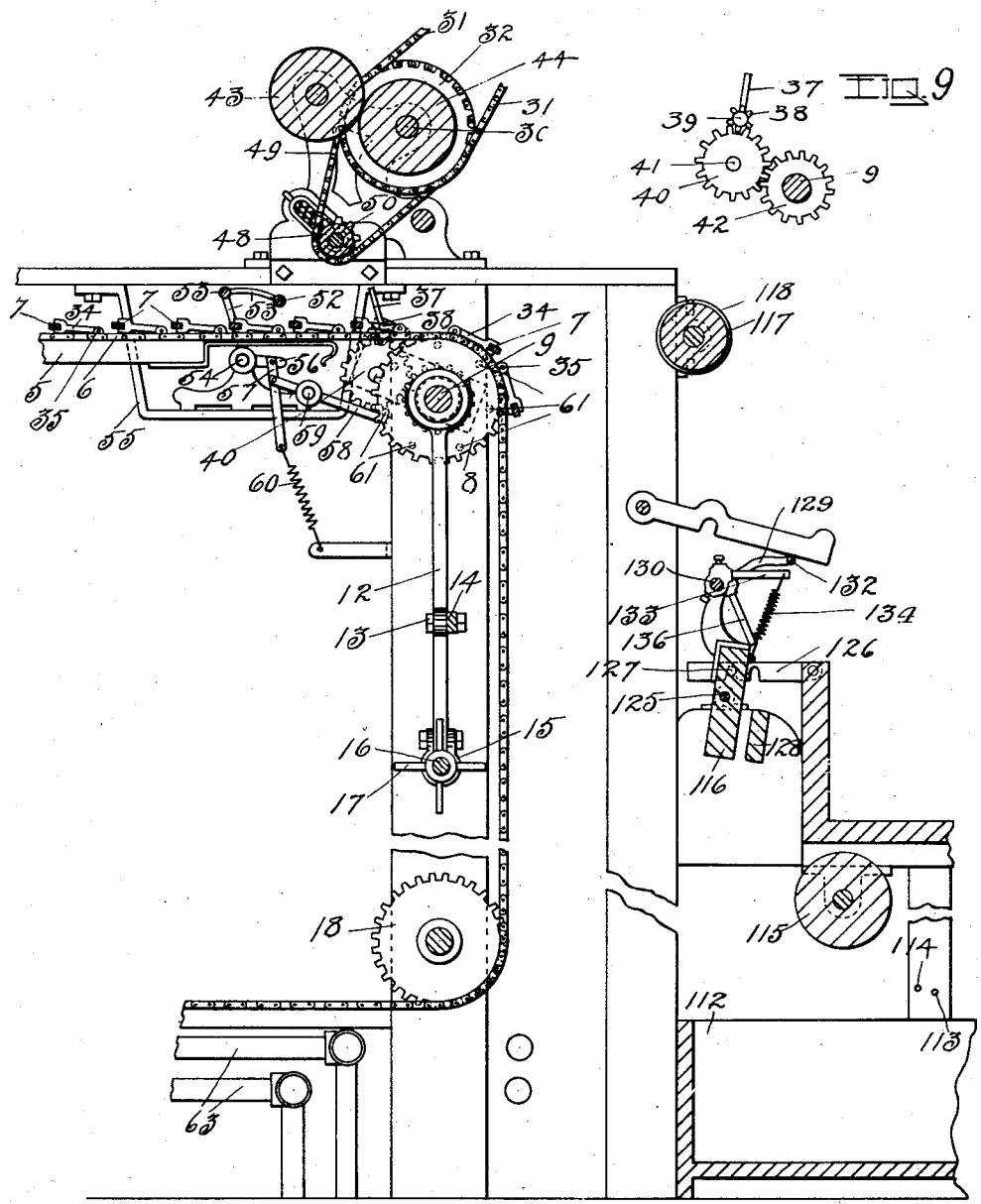

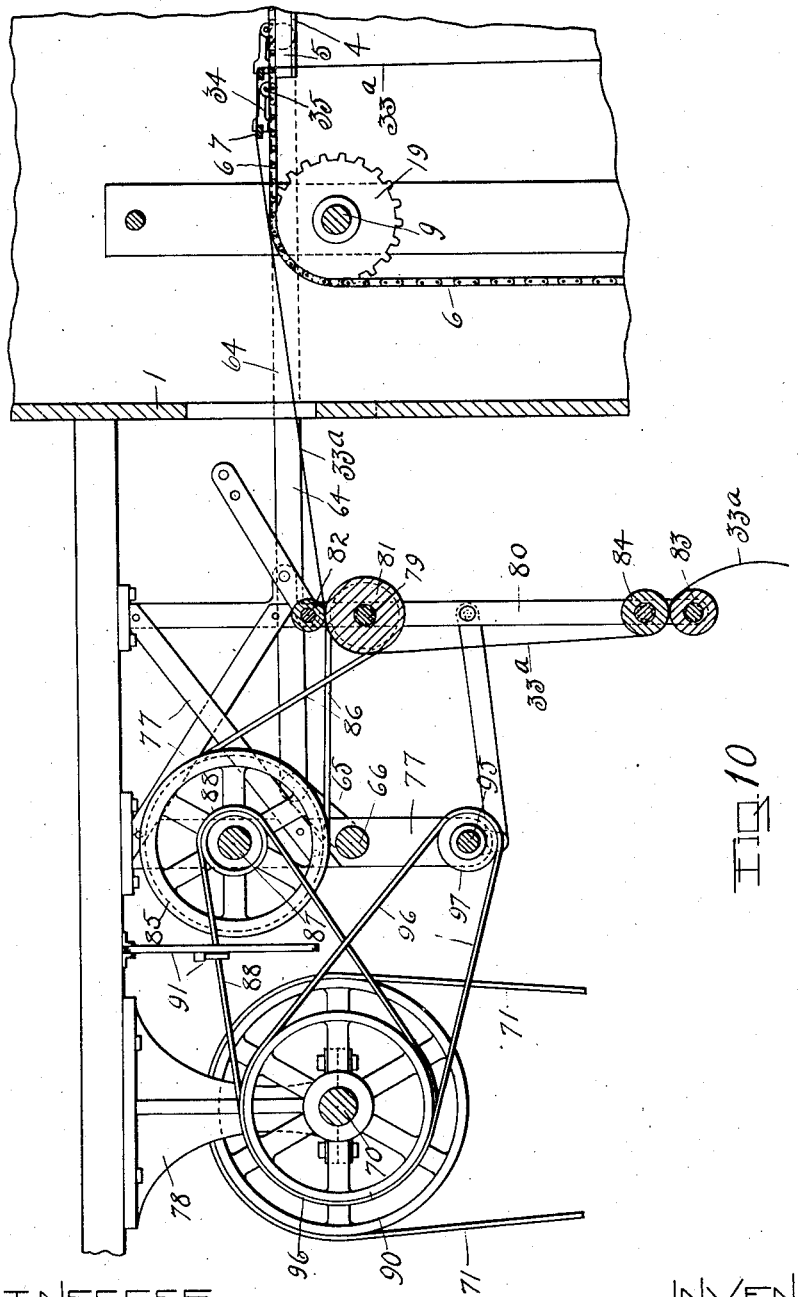

J. H. SCHALLER.
FABRIC DRYING APPARATUS.
APPLICATION FILED DEC. 7, 1910.
1,038,002.
Patented Sept. 10, 1912.
11 SHEETS—SHEET 10.
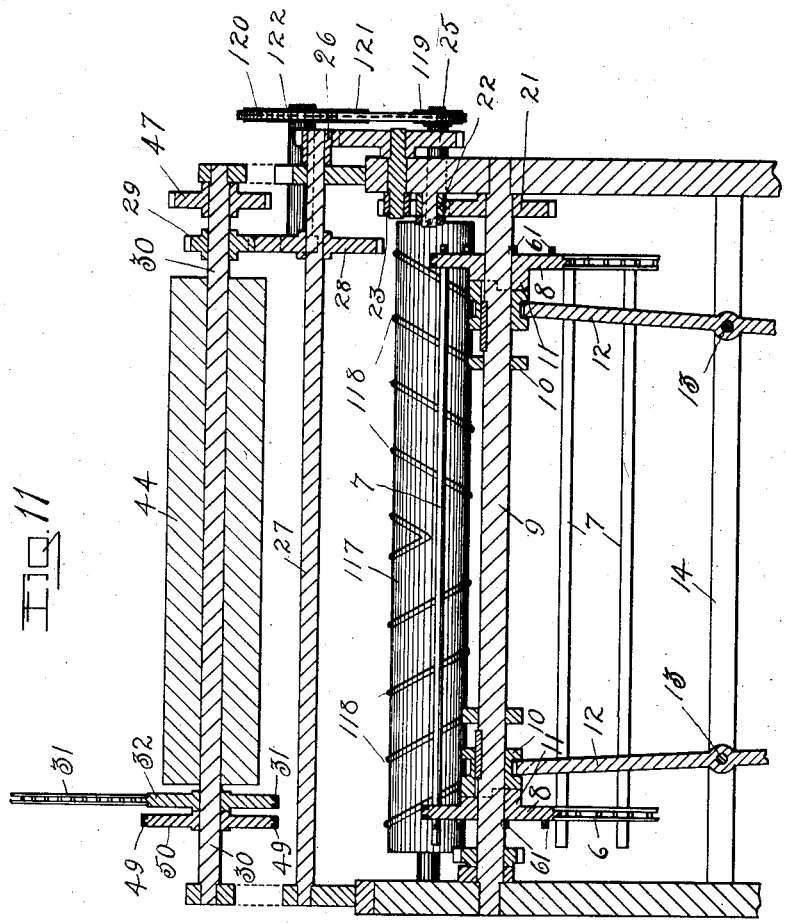
WITNESSES
R. A. Leduc.
J. E. Donobach.
INVENTOR
Johannes H. Schaller,
By Frank C. Curtis
Atty.

J. H. SCHALLER.
FABRIC DRYING APPARATUS.
APPLICATION FILED DEC. 7, 1910.

1,038,002.

Patented Sept. 10, 1912.
11 SHEETS—SHEET 11.

WITNESSES
R. A. Leduc
J. E. Donsbach

INVENTOR
Johannes H. Schaller
By Frank C. Curtis
Atty.

UNITED STATES PATENT OFFICE.

JOHANNES H. SCHALLER, OF TROY, NEW YORK, ASSIGNOR TO CLUETT, PEABODY & COMPANY, OF TROY, NEW YORK, A CORPORATION OF NEW YORK.

FABRIC-DRYING APPARATUS.

1,038,002.  Specification of Letters Patent.  Patented Sept. 10, 1912.

Application filed December 7, 1910.  Serial No. 596,046.

*To all whom it may concern:*

Be it known that I, JOHANNES H. SCHALLER, subject of the Emperor of Germany, residing at Troy, county of Rensselaer, and State of New York, have invented certain new and useful Improvements in Fabric-Drying Apparatus, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 2:
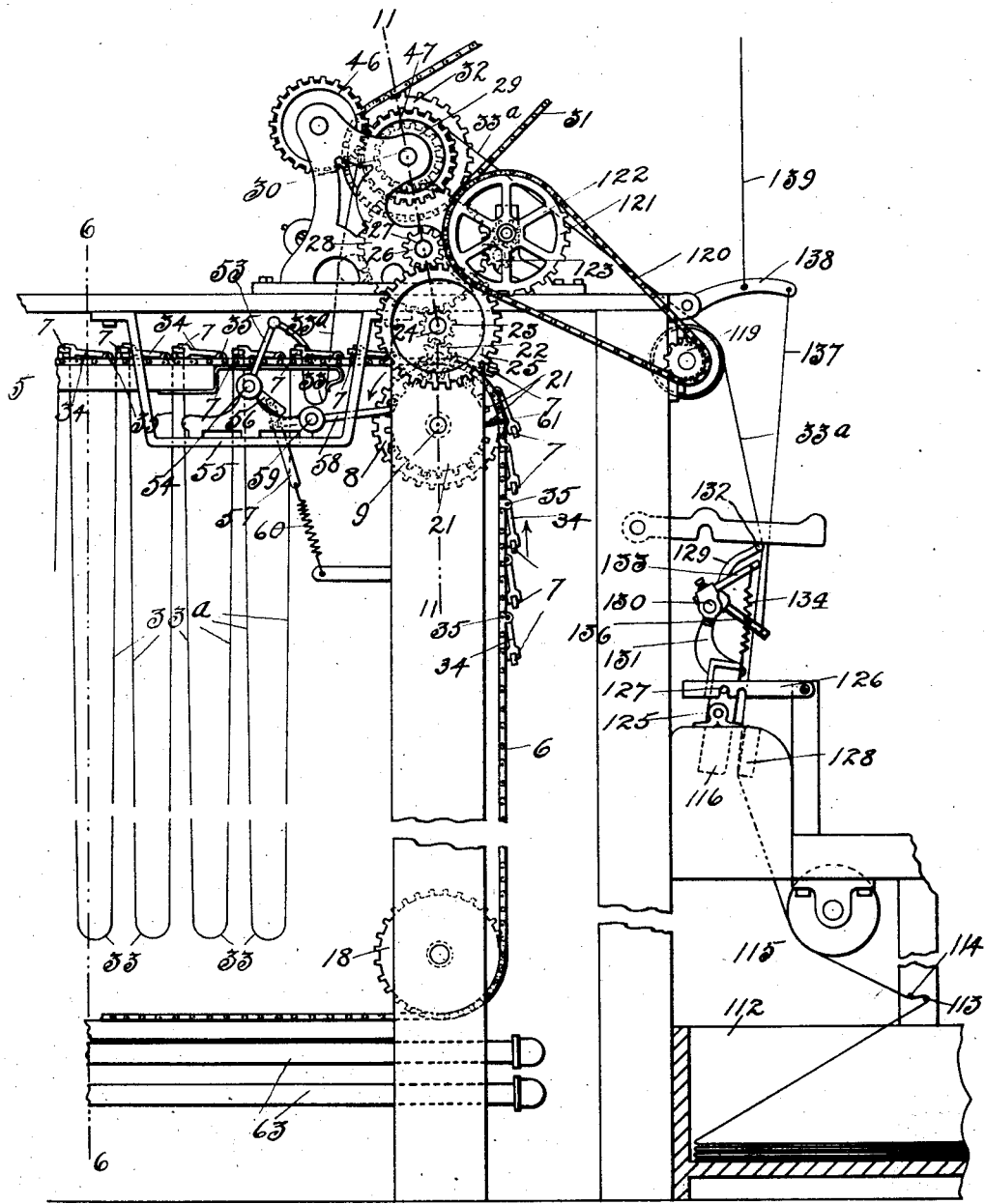
Figure 3:
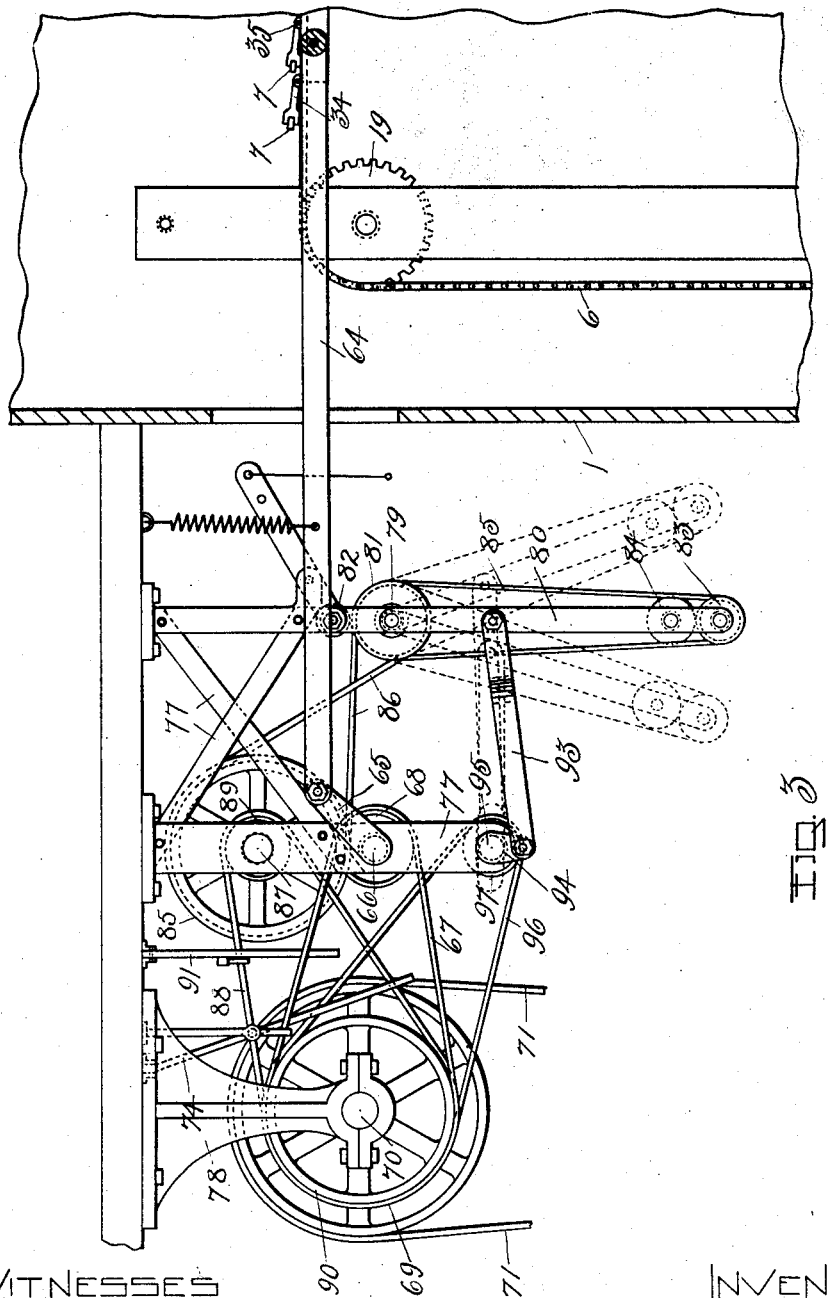
Figure 4:
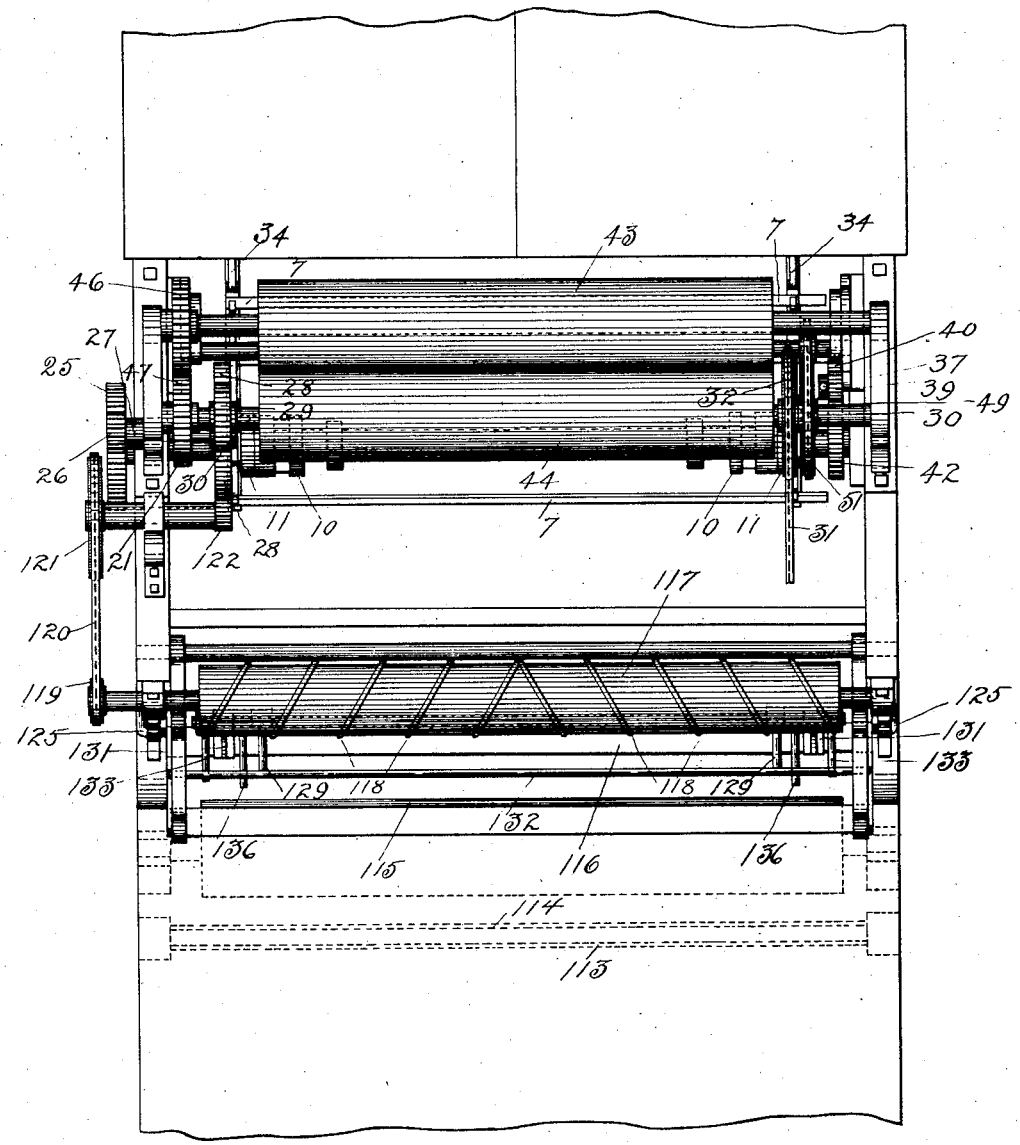
Figure 12:
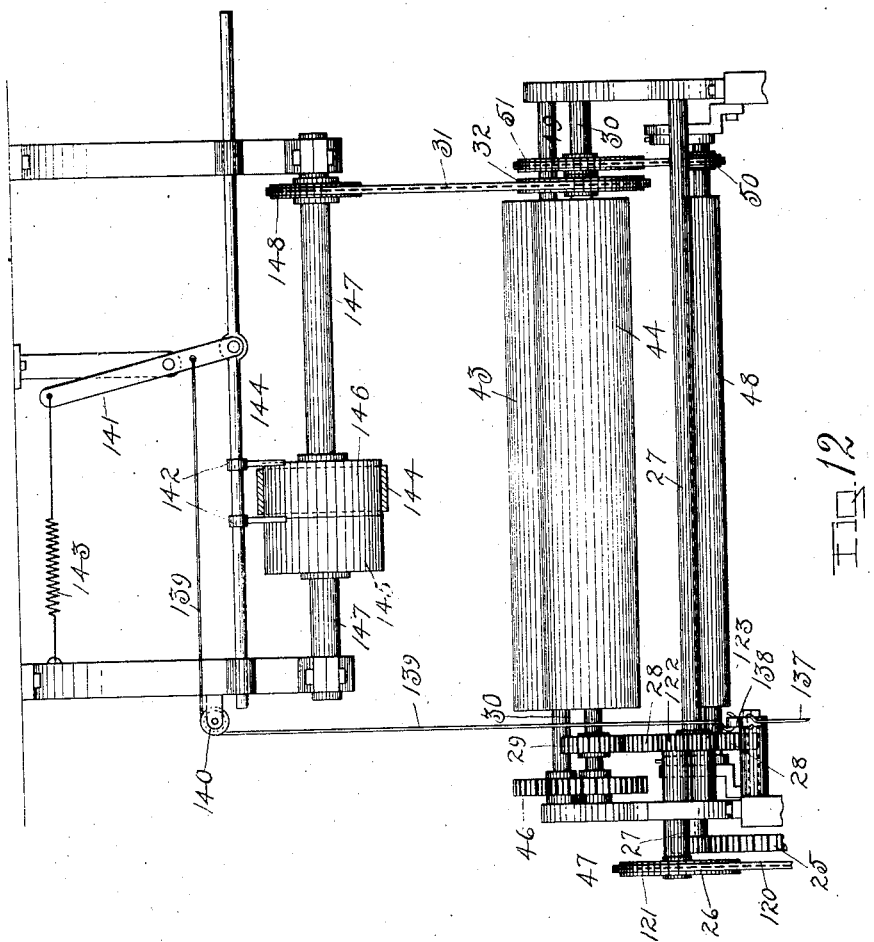

Figure 1 of the drawings is a view in side elevation of my improved fabric-drying apparatus with the front end broken away. This figure is drawn on a smaller scale than the other figures of the drawings. Fig. 2 is a similar view of the front end of the apparatus, partly in section, and with the near side-wall removed to show the interior parts of the apparatus. Fig. 3 is a view similar to Fig. 1, on a larger scale, with more of the apparatus broken away, and the rear end of the dry-room inclosure shown in vertical longitudinal section. Fig. 4 is a top plan view of the front end of the apparatus shown in Fig. 2. Fig. 5 is a vertical cross-section of the apparatus taken on the broken line 5—5 in Fig. 1, looking toward the rear of the apparatus. Fig. 6 is a vertical cross-section of the apparatus taken on the broken line 6—6 in Fig. 2, looking toward the front of the apparatus. Fig. 7 is a view in rear elevation of the apparatus with the lower portion thereof broken away. Fig. 8 is a vertical, longitudinal section of the front end of the apparatus, taken on the broken line 8—8 in Fig. 6. Fig. 9 is a view partly in section and partly in side elevation of the mechanism for inverting the positions of the fabric-carrying racks. Fig. 10 is a vertical longitudinal section of the fabric-delivering mechanism at the rear of the apparatus, taken on the broken line 10—10 in Fig. 7. Fig. 11 is a cross-section taken on the broken line 11—11 in Fig. 2, through the centers of the several shafts with which the members of the train of gears are connected for transmitting motion to various parts of the carrier-loading mechanism. Fig. 12 is a view in front elevation of the overhead driving mechanism from which power is transmitted to the carrier-loading mechanism at the front end of the apparatus.

The principal object of the invention is to dry webs of woven fabric without materially interfering with or controlling the shrinkage thereof.

Another object of the invention is to facilitate the delivery of the web of fabric to and from the drying apparatus.

Other objects of the invention will appear in connection with the following description.

The invention is adapted for thus drying fabrics intended for various uses, but it is particularly adapted for drying such woven fabrics as are used in the manufacture of shirts, collars and cuffs. These fabrics, which are principally cotton goods, are supplied to the trade in the form of long webs which have been treated in the mill or bleachery with a stiffening dressing or sizing, and have then been dried under tension and pressure exerted by heated rolls whereby the longitudinal threads of the fabric are stretched and the web thereby given an abnormal or unnatural length. When such fabric is afterward washed or saturated with water and permitted to dry while not under tension or pressure, the threads and fibers will shrink and return to their normal length.

It has been the common practice of shirt-collar-and-cuff manufacturers to make allowance, in the size of patterns from which the articles are cut, for the expected shrinkage, but this is found to be an unsatisfactory expedient and an unreliable method, because different fabrics have different coefficients of shrinkage, and such articles as collars, cuffs, neck-bands, wrist-bands, bosoms, &c., are made up of a plurality of plies, which plies are usually formed of different qualities of fabric, so that it is not only practically impossible to predetermine the size of the finished product, but the difference in shrinkage of the different plies tends to distort the article, for which reasons it is found necessary, after washing such articles as are required to have a definite length or size, to stretch the articles to such size by means of an apparatus designed for that purpose, as is well understood in the art. If, before making up the fabric into such articles, the various fabrics are thoroughly shrunk, the difficulties above referred to are practically eliminated. In shrinking such fabrics, in order to secure results which can be relied upon, it is necessary in drying the fabric to so support the same that it shall not be subjected to material tension or to influences which would cause one part of the web to shrink to a less extent than another part thereof.

My invention comprises an apparatus whereby these objects can be attained.

Referring to the drawings, wherein the invention is shown in preferred form, the apparatus comprises in part a drying room or inclosure, 1, within which the fabric is supported while the moisture is being eliminated therefrom. Arranged along the respective opposite side walls of said inclosure, in the upper part thereof, are two series of brackets, 2, all in substantially the same horizontal plane, upon each of which brackets is mounted an antifriction roller, 3. Upon the series of said rollers along each side wall of the inclosure is supported a rail, formed in part by an angle-iron, 4, and in part by a wooden bar, 5, seated in the angle of said angle-iron. The rails thus formed constitute a bed or way adapted to support, and along which is adapted to travel, a carrier comprising in part endless side-chains, 6, and cross-rods, 7, carried by said chains, each of said chains being adapted to rest upon one of the bars, 5, inside of the upwardly projecting vertical member of the angle-iron, 4, thereof, as shown in Fig. 5.

At the front end of the apparatus the chains, 6, pass over the respective sprocket-wheels, 8, rotatively mounted upon the cross-shaft, 9, and adapted to be connected to rotate therewith by means of the respective sliding clutch-members, 10, which clutch-members are adapted to be thrown into and out of engagement with the corresponding clutch-members, 11, on the hubs of the respective sprocket-wheels, 8, by means of levers, 12, fulcrumed at, 13, upon the cross-bar, 14, forming part of the stationary frame of the apparatus, the lower ends of said levers being connected with the respective nuts, 15, fitting the respective right-and-left-hand threaded ends of a cross-shaft, 16, which is adapted to be rotated by the spoked hand-wheel, 17, fixed thereon. By rotating the screw-shaft, 16, in one direction, the clutch-members, 10, can be thrown into engagement with the respective clutch-members, 11, and by rotating said screw-shaft in the opposite direction, the clutch-members, 10, can be thrown out of engagement therewith. The chains, 6, also pass around or over the respective sprocket-wheels, 18, at the front of the apparatus, in the lower part thereof, the respective sprocket-wheels, 19, at the rear end of the apparatus, in the upper part thereof, and the respective sprocket-wheels, 20, at the rear end of the apparatus, in the lower part thereof, the sprocket-wheels, 18, 19 and 20, being idle wheels.

Power is transmitted to the shaft, 9, by means of the gear-wheel, 21, fixed thereupon in mesh with the pinion, 22, which pinion also meshes with a pinion, 23, which is fixed upon a short shaft, 24, upon which shaft, 24, is also fixed a gear-wheel, 25, which meshes with a pinion, 26, fixed upon a shaft, 27, upon which shaft is also fixed a gear, 28, which intermeshes with a gear, 29, fixed upon the shaft, 30, which shaft, 30, is driven by a chain, 31, and sprocket-wheel 32. Power is thus transmitted by the chain, 31, to the sprocket-wheel, 32, and shaft, 30; from the shaft, 30, through the gear, 29, and 28, to the shaft, 27; from the shaft, 27, through the pinion, 26, and gear, 25, to the shaft, 24; and from the shaft, 24, through the pinion, 23, and the intermediate pinion, 22, and gear, 21, to the shaft 9.

The cross-rods, 7, are adapted to support successive loops, 33, of a web of fabric, 33$^a$, placed thereon in the position shown in Fig. 2, and an important feature of my invention consists in means for automatically placing upon said cross-rods, such loops of fabric. Each of the cross-rods, 7, is mounted at its opposite ends upon arms, 34, pivotally connected at, 35, with the respective chains, said cross-rod and its supporting arms constituting a rack adapted to swing upon the pivotal connection, 35. When in position to receive the loops, 33, of fabric, the racks on the upper stretch of carrier project rearward, that is, in the direction in which said upper stretch of carrier is moving. As these racks accompany the lower stretch of carrier in returning from the rear to the front of the apparatus, they are free to hang vertically downward from the carrier chains, and as they accompany the vertical stretch of carrier at the front of the apparatus in its upward movement, they, by gravity, assume a downwardly inclined position, as shown in Fig. 8, so that they project in a direction opposite to that in which the carrier is moving, just as they enter the upper stretch at the front of the apparatus. As a means for automatically swinging these racks from their forwardly to their rearwardly projecting positions, I provide a revolving arm or finger, 37, fixed upon the hub of a pinion, 38, rotatively mounted upon a stud, 39, and adapted to mesh with an intermediate gear, 40, rotatively mounted on a stud, 41, and adapted to be driven by an intermeshing gear, 42, fixed upon the shaft, 9, said gears and pinion being so proportioned that the arm or finger, 37, makes a complete revolution while the carrier is moving a distance equal to the distance between two neighboring racks or rods 7.

The fabric to be treated is, in loading the apparatus, fed to the rods, 7, from the feed-rolls, 43, and 44, to which feed-rolls it may be supplied wet from any desired source. The feed-roll, 44, is fixed upon the shaft, 30, and the rollers, 43, and 44, have fixed thereto respectively the intermeshing gears, 46 and 47, of equal size. The fabric passes from between the rollers, 43, and 44, over the small roll, 48, and thence downwardly between two neighboring cross-bars 7. The small roll, 48, is driven from the shaft, 30, by means of a chain, 49, which connects the sprocket-wheel, 50, fixed to the roll, 48, with the sprocket-wheel, 51, fixed upon the shaft 30. The upper stretch of the carrier has preferably a continuous, comparatively slow, rearward movement throughout the loading operation; and the speed of the carrier is so regulated with reference to the speed of the feed-rolls, 43, and 44, that the desired length of fabric to make a loop, 33, will be fed between said feed-rolls during the interval required for the movement of the carrier a distance equal to the distance between two neighboring cross-bars or racks. The loops, 33, should be so limited in length that the weight of the hanging portion of the loop will not be sufficient to cause a material strain or tension upon the upper portions of the loops which rest upon the cross-bars, 7, and, as the length of the loop which can thus be safely employed will vary with different fabrics, the relative speed of the carrier and feed-rolls can be varied accordingly by changing the proportions of some of the members of the train of gears above described and whereby the movements are imparted to the respective parts of the apparatus.

In order to insure accuracy in the length of the loops, and to insure the proper laying or folding of the fabric upon and over each cross-rod, I provide a folder comprising a cross-bar, 52, mounted upon a frame, 53, the end bars of which are fixed upon the respective rock-shafts, 54, having bearings in the respective hangers, 55, fixed to the main stationary frame of the apparatus on opposite sides of the carrier. The rock-shafts, 54, are located in a plane below that of the upper stretch of the carrier, and in a line in rear of the path of feed movement of the fabric in passing from the feed-roll, 48 down through the carrier between two neighboring cross-bars, 7; and said frame, 53, has its upper end offset forwardly in the form of a hook at the point of which is located the folder-bar 52. A rocker-arm, 56, on each rock-shaft, 54, is connected by a link, 57, with one arm of a trip-lever, 58, fulcrumed at 59, upon the hanger, 55, the other end of which trip-lever, 58, is yieldingly held by the action of the spring, 60, in the path of a plurality of pins, 61, projecting from the side of the neighboring sprocket-wheel, 8. The successive pins, 61, are separated from one another by distances corresponding with the distances between successive neighboring cross-bars, 7, in the carrier, so that one of the pins, 61, passes the neighboring end of the trip-lever, 58, during each interval while the carrier is traveling a distance equal to the distance between two neighboring cross-bars 7. As each pin, 61, engages the neighboring end of the trip-lever, 58, it gradually depresses the same, thereby forcing the folder, 52, against the force of the spring, 60, slowly to its rearward position, as shown in Fig. 8, and as said pin leaves the end of the trip-lever to release the same, the folder-bar, 52, is, by the force of the spring, 60, thrown quickly forward and downward, carrying the fabric with it forward over the cross-bar which lies just in front of the fabric, and downward between that cross-bar and the next forwardly located cross-bar, as shown in Fig. 2.

By the continuous operation of the apparatus above described, successive portions of the carrier will be loaded and carried toward the rear of the apparatus until the entire web of fabric has been thus loaded upon the carrier in the form of loops, 33. When the entire web has been thus loaded upon the carrier, the supply of power to the drive-chain, 31, is interrupted, and the clutch-members, 10, are thrown out of engagement with the clutch-members, 11, in the manner above described, thereby making the sprocket-wheels, 8, merely idlers. For certain purposes of the invention, the fabric thus loaded upon the carrier can be left to simply hang thereon within the dry-room inclosure until dry, the drying operation being facilitated by the use of subjacent steam-pipes, 63, whereby the air within the dry-room inclosure is heated. I prefer, however, to further facilitate the drying operation by agitating, during the drying operation, both the fabric and the air within the dry-room inclosure. As a means for causing such agitation, I connect the rear ends of the respective side rails, 5, each by a pitman, 64, with the wrist-pin of a crank, 65, fixed upon the end of a crank-shaft, 66, which crank-shaft is adapted to be rotated by a belt-connection, 67, between the pulley, 68, thereon, and a pulley, 69, on the main power-shaft, 70, at the rear of the apparatus. This main power-shaft, 70, is driven by a pulley, 71, adapted to be shifted at will from one to the other of the tight pulley, 72, and loose pulley 73.

The sprocket-wheels, 8, being disconnected from the clutch-members, 10, and therefore free to move freely on the shaft, 9, the carrier and its supporting sprocket-wheels which thus become all idlers are free to respond to the to-and-fro movement thus imparted to the rails, 5, and the carrier will accompany said rails in their to-and-fro movements. The belt, 67, is adapted to be moved by a belt-shipper, 74, operated by a handle, 75, from one to the other of the tight pulley, 69, and the loose pulley, 76, on the shaft, 70, whereby the to-and-fro motion of the rails can be started and interrupted at will. The crank-shaft, 66, has bearings in the hanger-frame, 77, and the main power-shaft, 70, has bearings in the hanger-frame 78.

A further feature of my invention consists in means for delivering from the drying apparatus the fabric when dry. For this purpose I mount upon the hanger-frame, 77, by means of pivotal connections at 79, a swinging frame, 80, said hanger-frame having also rotatively mounted thereon concentric with the pivotal connections, 79, a feed-roll, 81, coöperative with a feed-roll, 82, also rotatively mounted on said hanger-frame. At the lower end of the swinging frame, 80, are mounted thereupon a pair of feed-rollers, 83, and 84. The roller, 83, is driven from the roller, 81, by means of a belt-connection, 85, between pulleys fixed on the rolls respectively; and the roll, 81, is driven from the pulley, 85, through a cross-belt connection, 86, between said pulley and a pulley fixed on said roll 81. The pulley, 85, is fixed upon a cross-shaft, 87, having bearings in the hanger-frame, 77, which shaft, 87, is driven by means of a belt-connection, 88, between a pulley, 89, fixed thereon and a pulley, 90, fixed upon the main-power-shaft 70. The belt, 88, can be shifted by means of the belt-shipper, 91 from one to the other of the fixed pulley, 89, and a loose pulley, 92, on the shaft 87. A feed movement can thus be imparted to the feed-rolls, 81 and 82 and to the feed-rolls, 83, and 84, at the will of the operator.

A vibratory or swinging motion can be imparted to the swinging frame, 80, through a pitman-rod, 93, connecting each side of the swinging frame with the wrist-pin of a crank, 94, fixed upon a crank-shaft, 95, having bearings in the hanger-frame, 77, and driven by means of a belt-connection, 96, between a pulley, 97, fixed thereupon and a pulley, 98, fixed upon the main power-shaft 70.

After the fabric in the dry-room inclosure has been dried to the desired degree, the operation of the crank-shaft, 66, is discontinued; the neighboring end of the fabric is fed out through an opening in the rear wall of the dry-room inclosure between the feed-rolls, 81 and 82, down to, and forwardly between, the feed-rolls 83 and 84; the clutch-members, 10, are thrown into engagement with the clutch-members, 11, on the sprocket-wheels 8; power is again transmitted to the drive-chain, 31, whereby a traveling movement is again imparted to the carrier; and the crank-shaft, 95, and the shaft, 87, are operatively connected with the running shaft 70. With the several parts thus operating, as each successive loop, 33, of the fabric is brought by the carrier adjacent to the rear wall of the inclosure, the fabric of said loop is automatically fed out or delivered through said opening between the rolls, 81, and 82, and between the rolls, 83 and 84, and is by reason of the swinging or vibratory movement of the frame, 80, laid or piled in folds upon the subjacent table, 99, the operation being continued until the entire web has been thus delivered from the carrier.

As soon as the unloaded cross-bars, 7, reach the upper stretch of the carrier at the front of the apparatus, the operation of loading the same with another web of wet fabric can be begun, and the operations of loading and unloading may be proceeded with simultaneously.

As the drying operation proceeds, it is desirable to replace from time to time the moisture-laden air within the dry-room inclosure with a fresh supply of air. To permit the air within the dry-room inclosure to be thus gradually changed from time to time, I provide in the sides of the inclosure, near the bottom thereof, a plurality of vent-apertures, 100, adapted to be closed by sliding doors, 101, which doors are attached to an operating bar, 102, which is connected by a link, 103, with the lower arm of a lever, 104, fulcrumed at, 105, upon the side wall of the inclosure, and connected at its upper end at, 106, with the neighboring rail, 5, whereby, as said rail moves to and fro, each of the doors, 101, will be automatically alternately opened and closed. The top of the dry-room inclosure is also provided with a plurality of ventilators, 107, the outlet of each of which is controlled by a valve, 108, adapted to be automatically closed by a spring, 109, said valve, 108, being connected by cords, 111, passing over pulleys, 110, with the upper end of the lever, 106, whereby, as the side-rails, 5, move to and fro, each of the valves, 108, will be automatically opened and closed. The connections are preferably such that when the valves, 108, are opened, the doors, 101, are closed, and vice versa. The to-and-fro movement of the rails, 5, and carrier with the body of fabric thereupon, imparts to the fabric not only a to-and-fro movement as a whole, but also a pendulous movement of each loop, 33, from its supporting cross-bar, 7, as a result of which movements of the fabric, the air within the inclosure is considerably agitated, so that, with the opportunity afforded by said vent-openings, a considerable body of air is changed at each to-and-fro movement of the fabric.

As a preferred means for supplying to the feed-rolls, 43 and 44, the wet web of fabric, I have shown at the front of the apparatus, a tub or vat, 112, from which the web passes over guide-rods, 113 and 114, to and partly around a guide-roller, 115, thence through a tension device, 116, to and partly around a spreading-roll, 117, from which the fabric passes to and between the feed-rolls, 43, and 44, as shown in Fig. 2. The spreading-roll, 117, has upon its surface two ribs, 118, which wind spirally around the roll from its respective ends toward its middle, one of said ribs being in the form of a right-hand spiral, and the other of a left-hand spiral. This spreading-roll is driven at a peripheral speed much greater than the speed of feed-movement of the fabric, power being transmitted thereto through the sprocket-wheel, 119, fixed thereon, and connected by a chain, 120, with a sprocket-wheel, 121, upon which is fixed a pinion, 122, connected by an intermediate pinion, 123, with the gear-wheel 28. The direction of the respective spiral ribs, 118, on the spreading-roll is such that as said roll is rapidly rotated in engagement with the slowly moving web, the same points on the fabric are successively engaged by parts of the respective ribs which diverge from each other and tend to spread or stretch out the web from its center to its side edges, thereby removing wrinkles from the web, and causing it to be delivered in smooth condition to the feed-rolls, 43 and 44.

The tension device, 116, comprises a plate rotatively mounted at, 125, upon the main frame of the apparatus, and adapted to be supported in a more or less inclined position by means of the hook, 126, having a plurality of notches adapted to receive the pin, 127, on the plate 116. The upper edge of the plate, 116, thus forces the web of fabric to a greater or less extent against a stationary tension-plate, 128, in order to give to the fabric the tension necessary to enable the spreading-roll, 117, to properly perform its function.

Mounted upon the carrier with the movable tension-plate, 116, is a stop-motion, whereby the power is automatically cut off from the driving shaft of the loading mechanism when the end of the web is released from the control of the tension device. This stop-motion comprises an arm, 129, fixed upon a rock-shaft, 130, mounted in bearings in a bracket, 131, projecting upwardly from the tension-plate, 116, said arm, 129, having on its upper and outer end a finger, 132, adapted to bear upon the web and be supported in raised position as shown in Fig. 2, so long as the web is under tension. An arm, 133, also fixed upon said rock-shaft, 130, is connected by a coil-spring, 134, with the tension-plate, 116, said spring tending to impart to the arm, 129, a downward movement, which is prevented so long as the fabric with which the finger, 132, is in engagement, is under tension. As soon as the end of the web passes from the control of the tension device, 116, the arm, 129, yields to the influence of the spring, 134, and moves downward from the position shown in Fig. 2, to the position shown in Fig. 8, thereby imparting a rocking motion to the rock-shaft 130. Fixed upon the rock-shaft, 130, is another rocker-arm, 136, connected by a link, 137, with a lever, 138, which lever is also connected by a cord, 139, passing over a pulley, 140, with one arm of the controlling lever, 141, of a belt-shipping device 142. A coil-spring, 143, connected with the lever, 141, is adapted to operate the belt-shipping mechanism in a direction to move the main drive-belt, 144, from a loose pulley, 145, to a fixed pulley, 146, on the shaft, 147, which shaft has fixed thereon a sprocket-wheel, 148, connected by the sprocket-chain, 31, with the sprocket-wheel, 32, above described. So long as the stop-motion arm, 129, is supported in raised position by the web of fabric, the belt, 144, will remain upon the fixed pulley, 146, but as soon as the arm, 129, is released from the supporting control of the fabric by reason of the approach of the end of the web, the downward movement of the arms, 129, and 136, induced by their weight, and by the spring, 134, serves to exert a pull upon the cord, 139, sufficient to overcome the force of the coil-spring, 143, and move the belt-shipping apparatus, 142, in a direction to shift the belt from the fixed pulley, 146, to the loose pulley, 145, whereby the operation of the loading mechanism is automatically discontinued upon the approach of the end of the web.

What I claim as new and desire to secure by Letters Patent is—

1. In an apparatus in the class described, and in combination, a movable carrier having fabric-supporting cross-rods; means for moving said carrier; means for feeding a web of fabric down through said carrier; an automatically operating folder movable relatively to the cross-bars into engagement with the web for folding the web of fabric over the successive cross-bars in a succession of loops and means for intermittently operating said folder.

2. In an apparatus of the class described, and in combination, a movable carrier having fabric-supporting cross-rods; a pair of downwardly feeding feed-rolls above said carrier; means for continuously operating said feed-rolls and said carrier; a folder movable into engagement with the fabric above the carrier in a direction opposite to that in which the carrier is moving; and means for automatically operating said folder at predetermined intervals.

3. In an apparatus of the class described, and in combination, a movable carrier having fabric-supporting cross-rods; a pair of downwardly feeding feed-rolls above said carrier; means for continuously operating said feed-rolls and said carrier; a folder movable into engagement with the fabric above the carrier in a direction opposite to that in which the carrier is moving; a wheel rotatory in engagement with said carrier; and mechanism carried by said wheel whereby an intermittent operation of said folder is induced at predetermined intervals.

4. In an apparatus of the class described, and in combination, a movable carrier having fabric-supporting cross-rods; a pair of downwardly feeding feed-rolls above said carrier; means for continuously operating said feed-rolls and said carrier; a folder movable into engagement with the fabric above the carrier in a direction opposite to that in which the carrier is moving; a wheel rotatory in engagement with said carrier; a series of pins carried by said wheel; continuously operating yielding means for imparting a folding movement to said folder; and means for positively imparting to said folder a return movement, comprising in part a lever connected therewith having one of its arms located in the path of said pins.

5. In an apparatus of the class described, and in combination, a movable carrier having cross-rods adapted to support a web of fabric in loops hanging therefrom; a support, an oscillatory frame pivotally mounted upon said support; a pair of feed-rolls mounted in bearings upon the swinging end of said frame; a guide-roll mounted concentrically with the axis of oscillation of said frame; means for operating the respective rolls; means for oscillating said frame; means for moving said carrier toward said frame; and a support subjacent to said frame upon which the fabric is adapted to be laid in folds by said feed-rolls as said frame is oscillated.

6. In an apparatus of the class described, and in combination, a fabric-supporting carrier capable of a progressive movement and of a to-and-fro movement; mechanism for feeding a web of fabric to said carrier; and means for imparting to said carrier at certain times a progressive movement, and at certain other times a to-and-fro movement.

7. In an apparatus of the class described, and in combination, a fabric-supporting carrier capable of a progressive movement and of a to-and-fro movement; mechanism for feeding a web of fabric to said carrier; means for imparting to said carrier at certain times a progressive movement, and at certain other times a to-and-fro movement; and a pair of feed-rolls for withdrawing the fabric from said carrier.

8. In an apparatus of the class described, and in combination, a movable carrier having cross-rods adapted to support a web of fabric in loops hanging therefrom; a pair of feed-rolls for withdrawing the fabric from said carrier; means for moving the carrier toward said feed-rolls; a frame movable to and fro; bearings for said feed-rolls mounted upon said frame; means for operating said feed-rolls; means for imparting to said frame a to-and-fro motion; and a support beneath said rolls upon which said rolls are adapted to lay said fabric in folds.

9. In an apparatus of the class described, and in combination, a movable carrier having fabric-supporting cross-rods; a carrier-supporting bed capable of longitudinal to-and-fro movement; operating mechanism for imparting to said bed at certain times a to-and-fro movement; mechanism for moving said carrier at certain times along said bed; mechanism for feeding a web of fabric in successive loops to the successive cross-rods of the moving carrier; means whereby said bed can be freed from the influence of its operating mechanism during the operation of feeding the web to the moving carrier; and means whereby said carrier can be freed from the influence of its operating mechanism, while a to-and-fro motion is imparted to said bed.

10. In an apparatus of the class described, and in combination, a movable carrier having fabric-supporting cross-rods; a carrier-supporting bed capable of longitudinal to-and-fro movement; operating mechanism for imparting to said bed at certain times a to-and-fro movement; mechanism for moving said carrier at certain times along said bed; mechanism for feeding a web of fabric in successive loops to the successive cross-rods of the moving carrier; means whereby said bed can be freed from the influence of its operating mechanism during the operation of feeding the web to the moving carrier; means whereby said carrier can be freed from the influence of its operating mechanism, while a to-and-fro motion is imparted to said bed; a pair of feed-rolls for withdrawing the fabric from said carrier; and means for operating said feed-rolls.

11. In an apparatus of the class described, and in combination, a movable carrier having fabric-supporting cross-rods; a carrier-supporting bed capable of longitudinal to-and-fro movement; a pair of feed-rolls for withdrawing the fabric from said carrier; mechanism for moving said carrier at certain times along said bed toward said feed-rolls; mechanism for feeding a web of fabric in successive loops to the successive cross-rods of the moving carrier; means whereby said bed can be freed from the influence of its operating mechanism during the operation of feeding the web of fabric to the moving carrier; means whereby said carrier can be freed from the influence of its operating mechanism, while a to-and-fro motion is imparted to said bed; a frame movable to and fro; bearings for said feed-rolls mounted upon said frame; means for operating said feed-rolls; means for imparting to said frame a to-and-fro motion; and a support beneath said rolls upon which said rolls are adapted to lay said fabric in folds.

12. In an apparatus of the class described, and in combination, a pair of feed-rolls adapted to receive therebetween a web of fabric; means for operating the same; a tension-device engageable with said web of fabric; a fabric-spreading roll located in the path of said fabric between said feed-rolls and said tension-device; means for imparting to said spreading-roll a peripheral movement relatively to the fabric; and rearwardly diverging rigs on said spreading-roll.

13. In an apparatus of the class described, and in combination, a pair of feed-rolls adapted to receive therebetween a web of fabric; means for operating the same; a tension-device engageable with said web of fabric; a fabric-spreading roll located in the path of said fabric between said feed-rolls and said tension-device; means for rotating said spreading-roll in the direction of movement of said fabric, and at a peripheral speed greater than the speed of the fabric; and rearwardly diverging ribs on said spreading-roll.

14. In an apparatus of the class described, and in combination, a pair of feed-rolls adapted to receive therebetween a web of fabric; means for operating the same; a tension-device engageable with said web of fabric; a fabric-spreading roll located in the path of said fabric between said feed-rolls and said tension-device; means of rotating said spreading-roll in the direction of movement of said fabric, and at a peripheral speed greater than the speed of the fabric; and a pair of ribs, extended, in the form of a left-hand spiral, and the other in the form of a right-hand spiral, rearwardly from the middle to the respective ends of said spreading-roll.

15. In an apparatus of the class described, and in combination, a fabric-supporting carrier; a pair of feed-rolls adapted to receive therebetween a web of fabric, and feed the same to said carrier; means for operating said feed rolls; a tension-device engageable with said web of fabric; a fabric-spreading roll located in the path of said fabric between said feed-rolls and said tension device; means for imparting to said spreading-roll a peripheral movement relatively to the fabric; and rearwardly diverging ribs on said spreading-roll.

16. In an apparatus of the class described, and in combination, a fabric-supporting carrier; a pair of feed-rolls adapted to receive therebetween a web of fabric, and feed the same to said carrier; means for operating said feed-rolls; a tension-device engageable with said web of fabric; a fabric-spreading roll located in the path of said fabric between said feed-rolls and said tension-device; means for imparting to said spreading-roll a peripheral movement relatively to the fabric; and a pair of ribs, extended, one in the form of a left-hand spiral, and the other in the form of a right-hand spiral, rearwardly from the middle to the respective ends of said spreading-roll.

17. In an apparatus of the class described, and in combination, a fabric-supporting carrier; a pair of feed-rolls adapted to receive therebetween a web of fabric and feed the same to said carrier; means for operating said feed-rolls; a tension-device engageable with said web of fabric; a fabric-spreading roll located in the path of said fabric between said feed-rolls and said tension-device; means for imparting to said spreading-roll a peripheral movement relatively to the fabric; rearwardly diverging ribs on said spreading-roll; and a pair of feed-rolls for withdrawing the fabric from said carrier.

18. In an apparatus of the class described, and in combination, a fabric-supporting carrier; a pair of feed-rolls adapted to receive therebetween a web of fabric and feed the same to said carrier; means for operating said feed-rolls; a tension-device engageable with said web of fabric; a fabric-spreading roll located in the path of said fabric between said feed-rolls and said tension-device; means for imparting to said spreading-roll a peripheral movement relatively to the fabric; a pair of ribs, extended, one in the form of a left-hand spiral, and the other in the form of a right-hand spiral, rearwardly from the middle to the respective ends of said spreading-roll; and a pair of feed-rolls for withdrawing the fabric from said carrier.

19. In an apparatus of the class described, and in combination, a movable carrier having fabric-supporting cross-rods; means, comprising in part a pair of feed-rolls, for automatically placing upon said rods successively, successive loops of a web of fabric; a tension-device engageable with said web of fabric; a fabric-spreading roll located in the path of said fabric between said feed-rolls and said tension-device; means for imparting to said spreading-roll a peripheral movement relatively to said fabric; and rearwardly diverging ribs on said spreading-roll.

20. In an apparatus of the class described, and in combination, a movable carrier having fabric-supporting cross-rods; means, comprising in part a pair of feed-rolls, for automatically placing upon said rods successively, successive loops of a web of fabric; a tension-device engageable with said web of fabric; a fabric-spreading roll located in the path of said fabric between said feed-rolls and said tension-device; means for imparting to said spreading-roll a peripheral movement relatively to said fabric; rearwardly diverging ribs on said spreading-roll; and a pair of feed-rolls for withdrawing the fabric from said carrier.

21. In an apparatus of the class described, and in combination, a movable carrier having fabric-supporting cross-rods; means, comprising in part a pair of feed-rolls, for automatically placing upon said rods successively, successive loops of a web of fabric; a tension-device engageable with said web of fabric; a fabric-spreading roll located in the path of said fabric between said feed-rolls and said tension-device; means for imparting to said spreading-roll a peripheral movement relatively to said fabric; rearwardly diverging ribs on said spreading-roll; and means for imparting to said carrier a to-and-fro movement.

22. In an apparatus of the class described, and in combination, a movable carrier having fabric-supporting cross-rods; means, comprising in part a pair of feed-rolls, for automatically placing upon said rods successively, successive loops of a web of fabric; a tension-device engageable with said web of fabric; a fabric-spreading roll located in the path of said fabric between said feed-rolls and said tension-device; means for imparting to said spreading-roll a peripheral movement relatively to said fabric; rearwardly diverging ribs on said spreading-roll; and means for imparting to said carrier at certain times a to-and-fro movement, and at certain other times a progressive movement.

23. In an apparatus of the class described, and in combination, a movable carrier having fabric-supporting cross-rods; means, for feeding to the carrier a web of fabric; a drive-shaft; operating connections between said drive-shaft and the fabric-feeding mechanism and said carrier; a drive-belt movable from one to another of a loose pulley and a fixed pulley on said drive-shaft; belt-shifting mechanism engageable with said belt; an automatically movable member adapted to be supported by the web of fabric being fed to said carrier; and mechanism whereby the movement of said member, when released from the control of the fabric, induces operation of the belt-shifting mechanism to shift said belt from said fixed to said loose pulley.

In testimony whereof, I have hereunto set my hand this 28th day of November 1910.

JOHANNES H. SCHALLER.

Witnesses:
E. M. SNYDER,
D. A. GILLESPIE.